UNITED STATES PATENT OFFICE.

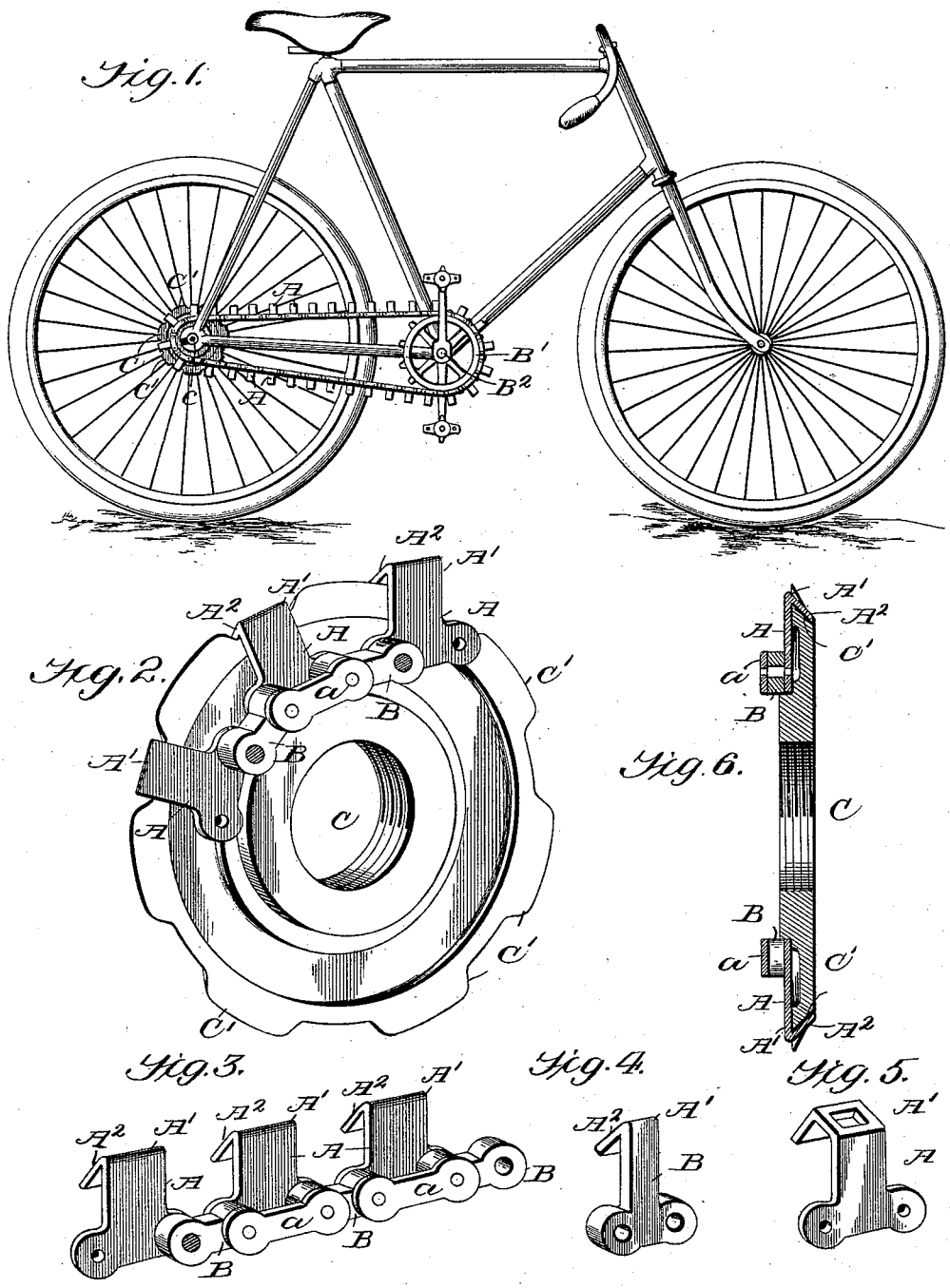

ISAAC KLING, OF LOUISVILLE, KENTUCKY.

SPROCKET DRIVING MECHANISM.

SPECIFICATION forming part of Letters Patent No. 601,570, dated March 29, 1898.

Application filed March 12, 1896. Serial No. 582,970. (No model.)

*To all whom it may concern:*

Be it known that I, ISAAC KLING, of Louisville, in the county of Jefferson and State of Kentucky, have invented certain new and useful Improvements in Sprocket Driving Mechanism; and I do hereby declare that the following is a full, clear, and exact description thereof, reference being had to the accompanying drawings, and to the letters of reference marked thereon, which form part of this specification.

This invention is an improvement in sprocket driving mechanisms and is illustrated as applied to safety-bicycles.

The invention consists in novel details of construction and combinations of parts, as will be best understood by the following description, taken in connection with the drawings, and as summarized in the claims at the end of this specification.

In the drawings, Figure 1 represents a side elevation of my improved sprocket driving mechanism as applied to a bicycle. Fig. 2 is an enlarged view of the rear sprocket-disk and part of chain. Fig. 3 is a detail perspective of a section of the chain, and Figs. 4 and 5 are detail perspectives of modifications of the chain. Fig. 6 is a cross-section through the disk and chain.

On referring to the drawings it will be seen that, as shown in Figs. 1 and 2, the sprocket-chain is composed of outer links A $a$, connected by central links B, the links being pivoted together as usual or in other desired manner. The inner row of links A, however, are formed with a projection A' on one edge, which is about an inch or more long and is bent over at the top to form a hook or shoulder A², as shown, so that when the chain is looked at from one side it appears to have a series of lateral hooks projecting from it. The hooks face away from the chain.

The chain is adapted to work on ordinary sprockets like those commonly in use, the hooks A² being arranged so as to radiate from the chain as it passes over the sprockets. An ordinary sprocket B is used on the pedal-shaft B² of the bicycle; but in place of the ordinary rear sprocket I employ a disk C, which is about twice the diameter of the sprocket that would ordinarily be used and has a series of projections or lobes C' on its periphery corresponding in number to the number of teeth on the sprocket which it replaces.

Ordinarily a seven or eight toothed sprocket is used on the rear axle of a bicycle and is about three inches in diameter. The disk I substitute therefor would be about five or six inches in diameter, but would only have seven or eight lobes, which are engaged by the hooks A² on the links of the chain that would ordinarily engage the teeth of the ordinary sprocket.

It will be noticed that the chain runs over the front sprocket B, and beside the disk C, but is nevertheless geared to and suspended from said disk by the hooks A². The object of this peculiar construction will be readily understood from the following explanation, based on practical experiments.

I have found that by substituting a seven or eight lobed disk C for the ordinary seven or eight toothed sprocket-wheel on the rear axle $c$ of the bicycle and by using the hooked chain, as described, better results may thereby be obtained.

The lobes C' on disk C are preferably rounded at the ends and beveled in cross-section, as shown, to facilitate the meshing and unmeshing of hooks A² therewith.

In Fig. 4 I have shown how hooks may be formed on the central links B, and in Fig. 5 I have indicated that instead of hooks the ends of arms A' may be provided with eyes which can engage suitable teeth on the periphery of the disk. These are merely some variations of the form of chain, and I do not confine myself to the special forms shown, as the advantages of the invention can be obtained by various modifications in the form of the device not herein shown or described, the essential feature being to provide an endless chain, belt, &c., with radiating or projecting arms adapted to engage a wheel or pulley of larger diameter than the chain itself could operate upon.

Having thus described my invention, what I therefore claim as new, and desire to secure by Letters Patent thereon, is—

1. A sprocket-chain adapted to engage an ordinary sprocket, alternate links of said chain having single radiating arms, provided with lateral depending hooks or extensions at their extremities, adapted to engage a disk, in combination with such disk, and ordinary sprocket, substantially as and for the purpose described.

2. A sprocket driving-chain having links formed with single radially-projecting arms, provided with laterally-depending hooks at their outer ends, substantially as and for the purpose described.

3. The combination with an ordinary sprocket-wheel, and a disk substantially as described, of a sprocket-chain running over said wheel, and having on one edge radiating arms provided with laterally-depending hooks adapted to engage the disk for the purpose and substantially as described.

4. In a bicycle the combination of an ordinary sprocket-wheel on the pedal-shaft, a lobed disk on the rear axle, and a sprocket-chain running over the sprocket and beside the disk, said chain having projecting arms provided with laterally-depending hooks on its links adapted to engage the lobes of the disk and hang the chain thereon and also to propel the disk, substantially as and for the purpose specified.

In testimony that I claim the foregoing as my own I affix my signature in presence of two witnesses.

ISAAC KLING.

Witnesses:
SPALDING COLEMAN,
M. J. FINNEGAN.